May 28, 1963 — R. E. WILSON — 3,091,170

CHARCOAL BROILER

Filed April 13, 1959 — 2 Sheets-Sheet 1

INVENTOR
RAYMOND E. WILSON
ATTORNEY

May 28, 1963 R. E. WILSON 3,091,170
CHARCOAL BROILER
Filed April 13, 1959 2 Sheets-Sheet 2
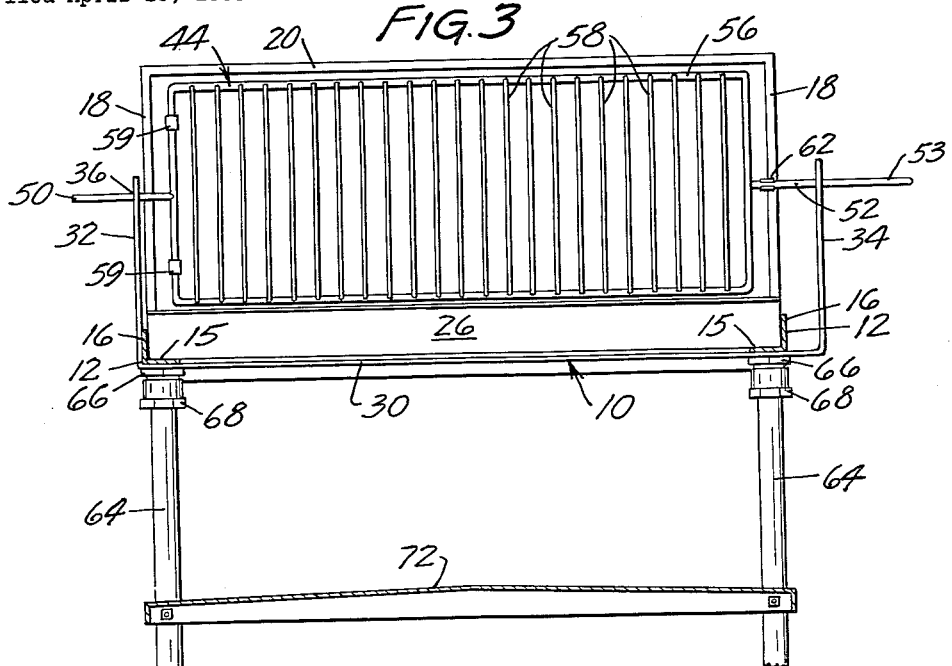
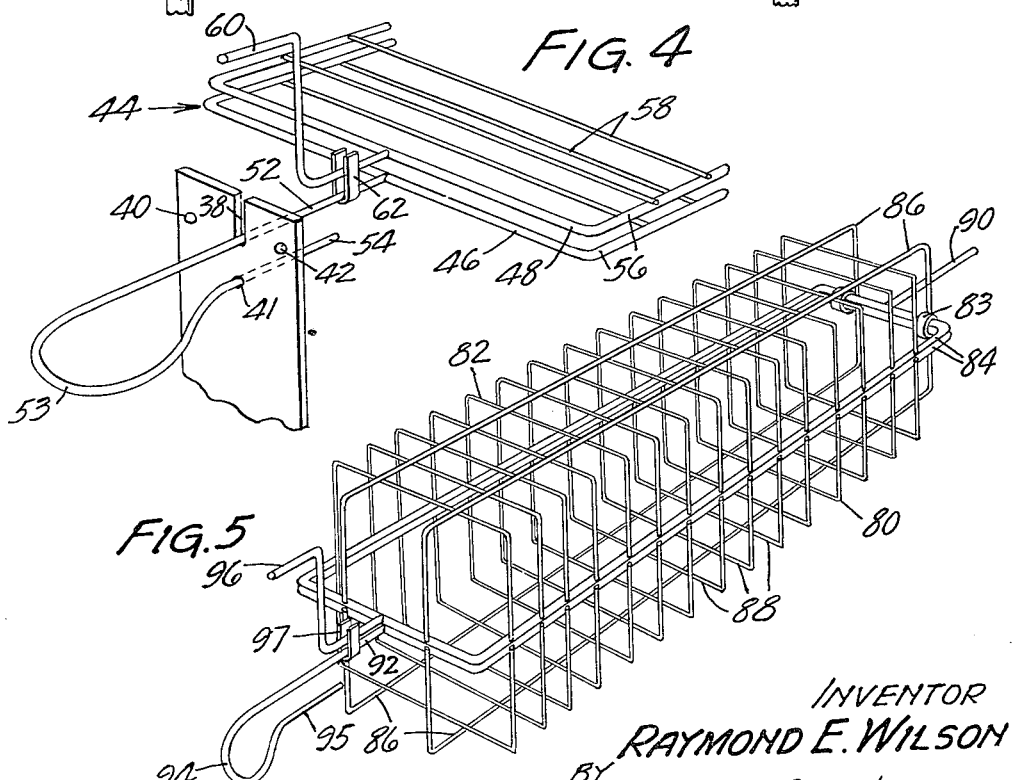
INVENTOR
RAYMOND E. WILSON
BY
ATTORNEY United States Patent Office 3,091,170
Patented May 28, 1963

3,091,170
CHARCOAL BROILER
Raymond E. Wilson, 4163 Forrest Court, White Bear Township, Ramsey County, Minn.
Filed Apr. 13, 1959, Ser. No. 806,140
1 Claim. (Cl. 99—390)

The present invention relates generally to outdoor-type broilers. More particularly, it relates to novel charcoal broilers having vertical movable opposed ovens each heated by a generally horizontally disposed heat source, between which ovens the meat or other food to be cooked is disposed on novel multi-positioned grill means.

Charcoal broilers and the like employing movable vertically disposed heating units have been heretofore known. In this respect, see Elbert Patent No. 1,656,181, granted January 17, 1928; Corra Patent No. 2,314,772, granted March 23, 1943; Fuller Patent No. 2,441,190, granted May 11, 1948, and, more recently, Tescula Patent No. 2,821,187, granted January 28, 1958. While being suitable in many respects, each of these, and other similar charcoal broilers, has various disadvantages. For example, in order to provide vertical heat for cooking, each utilizes vertical banks of charcoal. That is, each utilizes two or more vertical charcoal receptacles which are filled from top to bottom with charcoal when in use.

Although this type of vertical oven provides ample heat for effective cooking, an excessive amount of charcoal fuel is required to fill the receptacles. That is, if efficiently utilized a much smaller amount of charcoal is sufficient for virtually any cooking operation than is required to fill the receptacles. Moreover, disadvantages attendant with the use of large amounts of charcoal are present. For example, a proportionately longer time is required within which the entire banks of charcoal are sufficiently ignited for satisfactory cooking.

Also, in the broilers of the above-mentioned references, meat, fowl or other food to be cooked is first placed in a grill holder when detached from the broiler, and the grill holder subsequently is hung or fastened vertically in place between the charcoal banks. Although in some instances this may be advantageous, often it is desirable to have a grill disposed horizontally and stably, so that meat or food can be placed or set in the grill holder while the latter is in place on the broiler. (This is one advantage of the well-known type of charcoal broiler where the charcoal is situated in a bed below a large grill upon which the meat or food is disposed.)

Prior to the present invention, however, insofar as I am aware, no one has provided a charcoal broiler having vertically disposed ovens between which food to be cooked is situated, and wherein advantageous horizontal loading of the meat or food is permissable. Indeed, these may seem like antagonistic desires because ordinarily the food being cooked between vertical ovens is disposed vertically—not horizontally.

It is therefore an object of the present invention to provide a charcoal broiler having opposed vertical heat supplying units and wherein it is unnecessary to employ vertical banks of charcoal.

Another object of the present invention is to provide a novel charcoal broiler having opposed vertical heat supplying units wherein only a very small amount of charcoal fuel is necessary to provide ample heat for cooking.

Still a further object of the present invention is to provide a charcoal broiler utilizing vertical ovens and wherein it is readily possible to load meat, fowl and other food to be cooked, on a stable, horizontal grill member disposed in place in the broiler, and yet wherein the food is vertically disposed during cooking.

The manner in which these and other objects and advantages are attained in accordance with the teachings hereof will be apparent from the description which follows, in conjunction with the accompanying drawings, wherein like reference characters refer to like parts in the corresponding views, and in which:

FIGURE 3 is a section view taken along the lines 3—3 of FIGURE 2;

FIGURE 4 is an enlarged perspective view of one end of the grill and a grill support showing the manner in which the grill is multi-positionally mounted; and FIGURE 5 is a perspective view showing an alternative form of grill.

Figure 1:
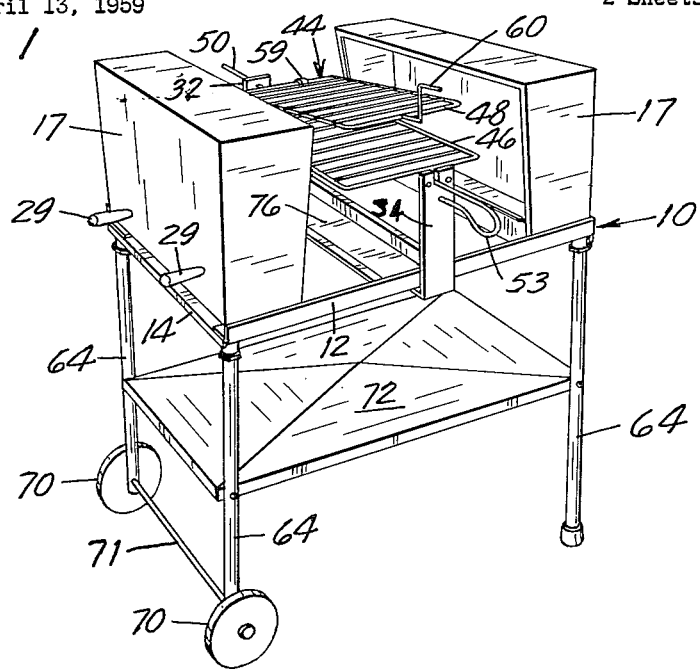
FIGURE 1 is a perspective view of a preferred embodiment of my invention with the vertical ovens spread apart, and with the grill member disposed in horizontal position.

Referring now to the drawings, and especially FIGURES 1–4 thereof, my novel device is seen to comprise a frame 10 made up of a pair of opposed lengthwise extending side members 12 of right angular cross section, and a pair of flat end members 14 extending perpendicularly with respect to the side members and affixed to the ends thereof. Said side members 12 are so disposed that one flange 15 there of extends horizontally inwardly and the other flange 16 extends upwardly vertically.

A pair of opposed vertical ovens 17 are slidable positioned on horizontal flanges 15, and between vertical flanges 16 of side members 12. Said ovens are each composed of a pair of end walls 18, a top wall 20, base 22 and back wall 24 assembled together, e.g., welded together, into a box-like structure. The ovens are also provided with a low front wall 26 affixed at its ends to end walls 18 and along its bottom edge to base 22. Said front wall extends upwardly for only a short distance leaving the remainder of the inwardly facing, i.e., frontal areas, of ovens 17 completely open. Preferably the ovens are entirely enclosed with the exception of these open frontal areas. For purposes of efficiency of heat utilization, end walls 18 are wider at the top than at the base of the ovens. Thus the gap between the opposed ovens is gradually decreased toward the top where most of the heated air and gases emerge.

The portion at the bottom of the ovens 17, defined by front wall 26, back wall 24 and end walls 18, serves as a rather shallow fuel receptacle 28 into which charcoal briquettes or similar fuel are placed.

Insulated handle members 29, which may be coiled wire handles similar to those found on some hearth utensils, are affixed to back walls 24. With these handles the ovens can be slidably manipulated along the length of side members 12 and their position thereby adjusted.

Extending perpendicularly to and across said members 12, approximately at the middle thereof, is an elongate flat bar 30, said bar being affixed to the underside of flanges 15. Exteriorly of side members 12 the ends of bar 30 are upturned to form grill supports 32 and 34. Grill support 32 is provided with a single aperture 36 near the upper end thereof. As shown particularly in FIGURE 4, the opposite grill support 34 is provided at its upper end with a vertical slot 38 and three apertures 40, 41 and 42, the diameters of which are substantially the same as the width of said slot. Said apertures 40, 41 and 42 are disposed about the bottom of slot 38 on equal radii. Apertures 40 and 42 are disposed horizontally with respect to, and in line with, the bottom of the slot 38, while apertures 56 are disposed directly under said slot.

End opening grill 44, between the two grill halves 46 and 48 of which is retained food to be cooked, is supported on the grill supports by aligned shafts 50 and 52 extending from the opposite ends of first grill half 46. Shaft 50 is straight and, when the grill is in position, extends through aperture 36 of grill support 32. Shaft 52 extends from the other half grill 46 and rests in the bottom of slot 38. At its free end shaft 52 is formed into a loop 53 terminating in positioning end 54 which extends back parallel with shaft 52. The distance between said end 54 and the portion of shaft 52 which is parallel thereto is equal to the distance between the bottom of slot 38 (in which shaft 52 rests) and apertures 40, 41 and 42, respectively.

It will thus be seen that by pulling on loop 53 in a direction away from grill support 34, grill 44 will slide laterally until positioning end 54 is free of said support 34. In this position, grill 44 can be rotated 360 degrees (if ovens 17 are spread apart sufficiently). Said grill can then be locked into any of three positions, that is, in a vertical position with either side thereof down, or in a horizontal position, by appropriately rotating loop 53 and moving it toward grill support 34 so that positioning end 54 passes into the desired aperture 40, 41 or 42, as the case may be.

Of course, when desired grill 44 can be removed from the broiler by pulling loop 53 away from grill support 34 (thereby freeing positioning end 54), and then lifting on said loop whereby shaft 52 is free from slot 38, at which time the grill can be freed by pulling shaft 50 from aperture 36.

Each of the grill halves 46 and 48 is made up of a generally rectangular frame 56 having spaced parallel cross members 58 affixed to said frame at the ends thereof. The two grill halves are hingedly connected at the ends thereof adjacent grill support 32, by hinges 59, grill 44 thereby being end-opening as above mentioned. When the grill is locked into horizontal position with end 54 of loop 53 disposed in aperture 41, second grill half 48 is uppermost and thus can be moved about its hinged end upwardly away from and downwardly toward grill half 46, as indicated by the arrow in FIGURE 1. At its opposite end second grill half 48 is provided with a handle 60 by which it can be so manipulated. Said handle is bent as shown so that it is free of grill support 34 when the two grill halves are in closed position. A clip 62 serves to retain said grill halves in closed position by frictionally engaging the shaft 52 and handle 60.

Figure 2:
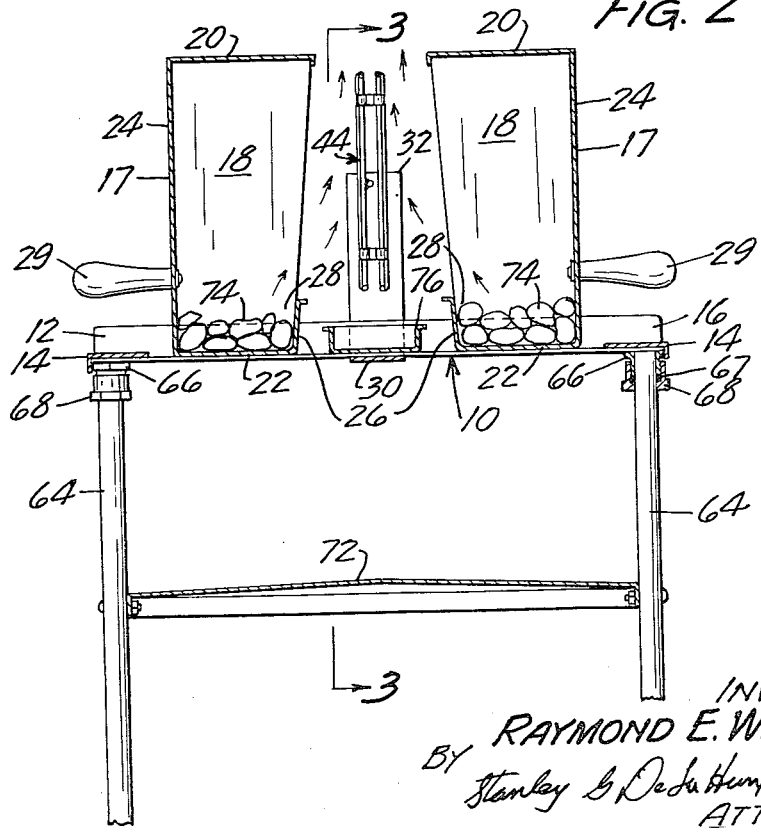
FIGURE 2 is a vertical section view taken lengthwise of the device of FIGURE 1 approximately midway across the ovens thereof, and wherein said ovens are disposed in cooking position, with the grill disposed vertically.

So that my broiler is disposed at a convenient height, legs 64 are affixed to the respective corners of frame 10. Said legs may be composed, for example, of three-quarter inch steel electrical conduit. Referring to FIGURE 2, said legs can be removably affixed to the frame 10 by a threaded coupling 66 which is welded to the underside of the frame at each corner thereof, a threaded end of said coupling extending downwardly. The upper end of a leg 64 extends into each coupling and is held in place by means of a compression ring 67 and cooperative nut 68, which extend about said leg with the nut being turned up tight on coupling 20, as is the conventional manner of fixing electrical conduit into place. To facilitate mobility of my device, the forward pair of legs 64 may be provided with wheels 70 rotatably mounted about axle 71, which passes through the lower ends of said legs.

A sheet metal tray 72 having approximately the same length as frame 10 and a width corresponding to the distance between laterally opposite legs is affixed to said legs at a height approximately midway along the length thereof. Said tray doubles as a stiffening support for the legs, as well as serving as a handy place upon which to set utensils, dishes, etc. to be employed in connection with the use of my broiler.

When my device is to be used a few charcoal briquettes 74 (FIG. 2) or such like are placed in the shallow fuel receptacles 28 in oven 17 and ignited. Only a few briquettes are necessary, for example, an amount sufficient to form a single layer, or less, in the fuel receptacle 28 in each oven. After the charcoal is burning to the proper degree, and with the ovens spread apart, grill 44 is positioned horizontally with the end 54 of shaft 52 extending into lower aperture 41. The grill is then opened by lifting back second grill half 48. The steaks or other food to be cooked are then positioned on the first grill half 46, the latter being locked stably in position. Second grill half 48 is then closed upon the food. Clip 62 is then applied to retain the grill 44 closed. As above described grill 44 is then rotated and locked into a vertical position with end 54 of grill shaft 52 extending into one of the horizontal apertures, for example, aperture 40. The ovens are then moved together into close relation to the vertically disposed grill 44. Heat from the charcoal is radiated and reflected from the sides of the walls of the ovens against the meat being cooked. I have found that cooking takes place extremely rapidly and evenly. In fact, my ovens are so efficient that my device is ideally suited for baking such foods as bread, rolls, cakes and pies as well as potatoes, etc. In such baking operations the foods can either be set on the grill (held stably in horizontal position) or held in a basket-type grill to be described shortly, as is appropriate. Because of the nature of construction of my device, the cooking operation is well shielded and is thus largely unaffected by winds.

The ovens may be moved apart or together, as desired, so that the proper cooking temperature is attained. After the meat or food has cooked for a few moments, particularly where flat foods such as steaks, ribs etc., it may be desirable to rotate grill 44 180 degrees. This is accomplished by removing end 54 of grill shaft 52 from aperture 40, rotating the grill and inserting said end 54 into the other horizontal aperture 42. Thus the side of the grill which was uppermost becomes lowermost.

During the cooking operation a fat tray 76, which simply sits on the horizontal portion of bar 30, catches any fat which drips from the cooking food. No fat falls into ovens 17, and, hence, little or no objectional smoke is emitted from the broiler during cooking.

Although it might be thought that it would be extremely warm near the sides of grill member 44, e.g., near loop 53 and handle 60, I have found that these areas are unusually cool, even during the height of the broiling operation. Apparently this is because draft air is drawn in from the sides, i.e., from between the ovens, since the ovens are otherwise enclosed. Heated air and gases pass upwardly about the cooking food and are expelled from between the ovens at the top thereof. Thus the areas immediately surrounding the edges of the grill remain quite cool, while just an inch or two inwardly thereof the temperature is extremely hot. The arrows in FIGURE 2 indicate paths followed by the air and gases.

Upon completion of the cooking operation, the ovens are spread apart, grill 44 is opened, and the cooked food removed. If it is desired to empty the ovens, they are simply picked up by their handles 29 and upended, so that the remains of the burned fuel are dumped out. Although the foregoing operation has been described in connection with a flat type of grill 44, a basket grill such as that shown in FIGURE 5 can also be employed. This is desirable for meats and foods, such as fowl, etc., which are not flat. Said basket grill functions similarly as does grill 44. However, the basket grill, instead of being made up of two flat grill halves, is made up of two basket grill halves 80 and 82, hingedly connected at one end thereof by hinges 83. Each basket half is made up of a rectangular frame 84 having a series of generally rectangularly shaped longitudinal bars 86 and a series of generally rectangularly shaped lateral bars 88 affixed at their respective ends to said frame. Said bars 86 and 88 collectively define the "basket." Said bars are affixed, e.g., welded, where they cross and contact one another. As before, basket grill half 80 is provided with mounting shaft 90 and 92 (the latter being provided with a loop 94 and 95)

similar to shafts 50 and 52 of of grill half 46. Also, grill half 82, like grill half 48 of grill 44, is provided with a handle 96 by which the grill is opened and closed. Clip 97 retains the grill halves closed.

Hereinabove I have described my invention with the aid of a specific preferred embodiment. This has been done for purposes of illustration, however, and not for limitation. Many equivalents of the particular device shown can readily be envisioned without departing from the spirit of my invention. For example, the ovens can take various shapes without lossing their box-like enclosed heat reflective character. All modifications and equivalents embracing the spirit of my invention are contemplated, as I do not intend to be limited except in accordance with the description hereof taken as a whole, including the appended claims.

What I claim is as follows:

A charcoal broiler comprising a supporting frame; a pair of spaced parallel guide flanges disposed on the top of said frame; a pair of vertically disposed opposed box-like reflector ovens slideably sitting on said frame between said guide flanges for movement toward and away from each other, the facing front sides of said ovens being open, and the rear sides, top surfaces and end walls thereof being essentially imperforate; a shallow fuel receptacle fixedly disposed at the bottom of each of said ovens of a depth to retain therewithin a layer of charcoal briquettes, said receptacles being bounded on the rear and ends respectively by the downward extensions of said rear and end walls, and on the front by an imperforate panel which extends across the front of said ovens and which joins said end wall extensions; said box-like ovens being otherwise free of mechanical interconnection with said guide flanges and said frame, and being removable therefrom for emptying said fuel receptacles simply by the act of lifting them upwardly with respect to said top of said frame; a pair of opposed spaced generally vertical supports disposed on said frame between and independently of said ovens and approximately parallel therewith; and a grill extending between said ovens rotatably carried by and between said supports independently of the movement of said ovens.

References Cited in the file of this patent

UNITED STATES PATENTS

| | | |
|---|---|---|
| 76,314 | Evard | Apr. 7, 1868 |
| 1,040,916 | Fell | Oct. 8, 1912 |
| 1,656,181 | Elbert | Jan. 18, 1928 |
| 2,891,465 | Rogge | June 23, 1959 |

FOREIGN PATENTS

| | | |
|---|---|---|
| 1,104,559 | France | June 15, 1955 |